(12) United States Patent
Wolter et al.

(10) Patent No.: US 11,699,877 B2
(45) Date of Patent: Jul. 11, 2023

(54) PLUG CONNECTOR ASSEMBLY

(71) Applicant: KOSTAL Kontakt Systeme GmbH, Luedenscheid (DE)

(72) Inventors: Martin Wolter, Dortmund (DE); Guido Eberhardt, Hagen (DE); Joerg Mueller, Sprockhoevel (DE); Michael Hasenbank, Dortmund (DE)

(73) Assignee: KOSTAL Kontakt Systeme GmbH, Luedenscheid (DE)

( * ) Notice: Subject to any disclaimer, the term of this patent is extended or adjusted under 35 U.S.C. 154(b) by 267 days.

(21) Appl. No.: 17/330,628

(22) Filed: May 26, 2021

(65) Prior Publication Data
US 2021/0281014 A1   Sep. 9, 2021

Related U.S. Application Data

(63) Continuation of application No. PCT/EP2019/083352, filed on Dec. 2, 2019.

(30) Foreign Application Priority Data

Dec. 4, 2018  (DE) .................... 10 2018 009 478.3

(51) Int. Cl.
*H01R 13/629* (2006.01)

(52) U.S. Cl.
CPC . *H01R 13/62955* (2013.01); *H01R 13/62938* (2013.01); *H01R 13/62977* (2013.01); *H01R 2201/26* (2013.01)

(58) Field of Classification Search
CPC ........ H01R 13/62938; H01R 13/62955; H01R 13/62977; H01R 13/62905; H01R 13/62911; H01R 13/62933; H01R 2201/26
(Continued)

(56) References Cited

U.S. PATENT DOCUMENTS

| 6,168,445 B1 * | 1/2001 | Seutschniker ... H01R 13/62977 439/157 |
| 6,217,354 B1 * | 4/2001 | Fencl ............... H01R 13/62977 439/372 |

(Continued)

FOREIGN PATENT DOCUMENTS

| DE | 19651436 A1 | 6/1998 |
| DE | 10308636 A1 | 10/2003 |

(Continued)

OTHER PUBLICATIONS

European Patent Office, International Search Report for International Application No. PCT/EP2019/083352, dated Feb. 26, 2020.
(Continued)

*Primary Examiner* — Marcus E Harcum
(74) *Attorney, Agent, or Firm* — Brooks Kushman P.C.

(57) ABSTRACT

A plug connector assembly includes first and second connector housings, a rotary lever, and a slide. The rotary lever has side faces each having a guide path into which in each case a guide pin on the second connector housing is inserted and is displaced along the guide path by rotation of the rotary lever whereby the connector housings move toward one another and electrical contact elements thereof connect. The slide is movable on the second plug connector housing. A driver element of the rotary lever cooperates in a form-fit manner with a driver element of the slide when the rotary lever rotates causing the slide to linearly move. A locking element of the slide is displaced relative to a locking element of the first connector housing when the slide linearly moves whereby a form-fit locking action between the locking elements may be established or cancelled.

4 Claims, 4 Drawing Sheets

(58) Field of Classification Search
USPC .................................................. 439/157, 372
See application file for complete search history.

(56) References Cited

U.S. PATENT DOCUMENTS

| | | | |
|---|---|---|---|
| 6,319,050 B1 | 11/2001 | Miyazaki et al. | |
| 6,361,336 B1* | 3/2002 | Zhao | H01R 13/62938 439/157 |
| 7,063,547 B2* | 6/2006 | Toyoda | H01R 13/62938 439/372 |
| 7,749,004 B2* | 7/2010 | Shuey | H01R 13/62944 439/157 |
| 7,789,690 B1* | 9/2010 | Rhein | H01R 13/707 439/352 |
| 8,197,270 B2 | 6/2012 | Vasbinder et al. | |
| 9,160,109 B2* | 10/2015 | Mauney | H01R 13/6275 |
| 9,583,860 B1* | 2/2017 | DeWitte | H01R 13/62933 |
| 9,583,875 B2* | 2/2017 | Griepenstroh | H01R 43/26 |
| 10,135,183 B1* | 11/2018 | Probert | H01R 13/62966 |
| 10,270,207 B1* | 4/2019 | Probert | H01R 13/502 |
| 2003/0190836 A1 | 10/2003 | Yamashita | |
| 2005/0245114 A1* | 11/2005 | Shiga | H01R 13/62938 439/157 |
| 2006/0292907 A1* | 12/2006 | Nishide | H01R 13/447 439/157 |
| 2007/0099461 A1* | 5/2007 | Pittenger | H01R 13/62955 439/157 |
| 2007/0232100 A1* | 10/2007 | Tyler | H01R 13/62977 439/157 |
| 2010/0048053 A1* | 2/2010 | Tonosaki | H01R 13/62938 439/299 |
| 2010/0178791 A1* | 7/2010 | Komiyama | H01R 13/62977 439/347 |
| 2010/0323537 A1* | 12/2010 | Vasbinder | H01R 13/62977 439/372 |
| 2011/0034049 A1* | 2/2011 | Shishikura | H01R 13/62955 439/157 |
| 2011/0070763 A1* | 3/2011 | Kobayashi | H01R 13/6295 439/345 |
| 2011/0155874 A1* | 6/2011 | Roehr | B60S 1/0881 248/220.21 |
| 2017/0279215 A1* | 9/2017 | Shibaya | H01R 13/62977 |
| 2018/0040979 A1* | 2/2018 | Ishida | H01R 13/635 |
| 2018/0331470 A1* | 11/2018 | Suzuki | H01R 13/62955 |
| 2019/0109401 A1* | 4/2019 | Yamane | H01R 13/7032 |
| 2019/0123485 A1* | 4/2019 | Probert | H01R 13/62938 |
| 2019/0229466 A1* | 7/2019 | Tsukiyoshi | H01R 13/62938 |
| 2019/0296484 A1* | 9/2019 | Suzuki | H01R 13/62938 |
| 2019/0379161 A1* | 12/2019 | Yasuda | H01R 13/62938 |
| 2019/0386430 A1* | 12/2019 | Furugoori | H01R 13/62933 |
| 2020/0014146 A1* | 1/2020 | Aoshima | H01R 13/6275 |
| 2021/0098950 A1* | 4/2021 | Paynter | H01R 24/40 |
| 2021/0226380 A1* | 7/2021 | Kobayashi | H01R 13/533 |

FOREIGN PATENT DOCUMENTS

| | | | |
|---|---|---|---|
| DE | 102012218034 A1 | 4/2014 | |
| DE | 102014001587 A1 * | 8/2014 | ....... H01R 13/62977 |
| DE | 102012018270 B4 | 9/2016 | |
| DE | 102017215516 A1 | 3/2019 | |
| EP | 1093191 A2 | 4/2001 | |
| EP | 1093191 B1 | 11/2004 | |
| EP | 3171462 A1 * | 5/2017 | ....... H01R 13/62955 |
| EP | 3232518 A1 * | 10/2017 | ....... H01R 13/62944 |
| FR | 2962857 A1 | 1/2012 | |

OTHER PUBLICATIONS

German Patent and Trademark Office, German Search Report for corresponding German Patent Application No. DE 10 2018 009 478.3 dated Nov. 18, 2019.

* cited by examiner

PLUG CONNECTOR ASSEMBLY

CROSS-REFERENCE TO RELATED APPLICATIONS

This application is a continuation of International Application No. PCT/EP2019/083352, published in German, with an International filing date of Dec. 2, 2019, which claims priority to DE 10 2018 009 478.3, filed Dec. 4, 2018, the disclosures of which are hereby incorporated in their entirety by reference herein.

TECHNICAL FIELD

The present invention relates to a plug connector assembly having a first plug connector with a first plug connector housing, a second plug connector with a second plug connector housing, and a rotary lever situated on the first plug connector housing, the rotary lever having two parallel side faces that are connected to one another, the side faces each having a guide path into which in each case a guide pin on the second plug connector housing is insertable in a first rotational position of the rotary lever and is displaced along the guide path by rotating the rotary lever, as a result of which the two plug connector housings are moved toward one another and electrical contact elements within the plug connector housings are connected to one another.

BACKGROUND

Plug connector assemblies in which one of two plug connectors has a plug connector housing with a rotary lever are known in various designs. The rotary lever is used as a force multiplier during connection and disconnection of the plug connectors. The rotary lever is therefore provided primarily when the insertion forces for connecting the contact elements of the plug connectors are relatively high. High insertion forces result when a fairly large number of contact elements are to be connected at the same time, i.e., for multipole plug connectors as well as for large-surface contact elements which individually already build up high contact elastic forces.

The latter applies, for example, to high-load plug connectors used for charging electrically operated motor vehicles. The contact elements of which conduct relatively high electrical currents, and at the same time, relatively high voltages.

A plug connector assembly having a rotary lever is known from German Patent specification DE 10 2012 018 270 B4. This plug connector assembly is for charging electric vehicles. A first plug connector has three single-core, high-current lines which, depending on their intended purpose, have a relatively wide cross section, and which are therefore relatively rigid and have a fairly high intrinsic weight over their length. This is problematic in particular for a plug connector assembly designed as a right-angle plug connector, since the intrinsic weight of the high-current lines and their leverage effect exert a rather large force on the mutually connected contact elements which results in tilting of the contact elements when these forces are not suitably absorbed.

To keep these forces low, the plug connector assembly described in DE 10 2012 018 270 B4 provides multiple pins that are integrally formed on the sides of the second plug connector housing and connected to grooves on the first plug connector housing. In order to complete these connections, after a rotational movement of the rotary lever has concluded, the rotary lever is linearly moved against the first and second plug connectors. As such, the rotary lever here may be more accurately referred to as a rotary slide lever. The rotary slide lever mechanism provided for connecting and locking the plug connectors has a relatively complicated design, and for connection requires a rotary movement and a sliding movement in succession, or vice versa for disconnection.

SUMMARY

An object is to provide a particularly stable plug connector assembly that allows the plug connectors to be easily connected and disconnected.

Embodiments of the present invention provide a plug-in connector arrangement including a first plug connector with a first plug connector housing, a second plug connector with a second plug connector housing, and a rotary lever arranged on the first plug connector housing. The rotary lever has two parallel side faces which are connected to one another. The side faces each have a guide path into which in each case a guide pin integrally formed on the second plug connector housing can be inserted in a first rotational position of the rotary lever and the guide pin is displaced along the guide path by rotating the rotary lever. As a result of which the two plug connector housings are moved toward one another and electrical contact elements within the plug connector housings connect to one another.

The plug-in connector arrangement further includes a slide. The slide is linearly movably guided on the second plug connector housing. A first driver element is arranged on the rotary lever. A second driver element is arranged on the slide. The first driver element interacts in a positive manner with the second driver element thereby causing the slide to move correspondingly.

A first locking element (first bolt element) is arranged on the first plug connector housing. A second locking element (second bolt element) is arranged on the slide. The second locking element is displaced in a translatory manner relative to the first locking element as the slide moves, as a result of which a positive locking action can be established or cancelled.

In carrying out at least one of the above objects and/or other objects, a plug connector assembly having first and second plug connectors, a rotary lever, and a slide is provided. The first plug connector has a first plug connector housing and the second plug connector has a second plug connector housing. The rotary lever is on the first plug connector housing. The rotary lever further has a pair of side faces that are connected to one another. The side faces each have a guide path into which in each case a guide pin on the second plug connector housing is inserted in a first rotational position of the rotary lever and is displaced in the guide path by rotation of the rotary lever whereby the plug connector housings are moved toward one another and electrical contact elements within the plug connector housings connect to one another.

The slide is linearly movable on the second plug connector housing. The first plug connector housing includes a first locking element. The rotary lever has a first driver element. The slide has a second driver element and a second locking element.

The first driver element of the rotary lever cooperates in a form-fit manner with the second driver element of the slide when the rotary lever rotates causing the slide to linearly move as the rotary lever rotates. The second locking element of the slide is displaced relative to the first locking element of the first plug connector housing when the slide linearly moves as the rotary lever rotates whereby a form-fit locking action between the first and second locking elements may be established or cancelled.

In embodiments of the present invention, at least one of the above and/or other objects is achieved in that a first driver element, situated on the rotary lever, cooperates in a form-fit manner with a second driver element, situated on a slide that is linearly movably guided on the second plug connector housing, when the rotary lever is rotated, and a second locking element, situated on the slide, is displaced relative to a first locking element, situated on the first plug connector housing, when the slide translationally moves due to the cooperation between the driver elements during rotation of the rotary lever, as a result of which a form-fit locking action may be established or cancelled.

The first driver element is integrally formed on the rotary lever. The first driver element may be designed, for example, as a tab that merely protrudes radially from the rotary lever relative to the bearing point of the tab, or as a gearwheel segment that is integrally formed on the rotary lever.

The second driver element is integrally formed on the slide. As indicated above, the slide is linearly displaceable and is on the second plug connector housing. The second driver element is appropriately integrally formed on the displaceable slide for cooperation with the associated first driver element, for example as a simple recess or as a toothed rack section.

It is particularly advantageous that the rotary lever may otherwise have a quite simple design. For parallel guiding and distribution of forces, the rotary lever has two parallel side faces which are connected to one another, and which in each case do not have to have more than one guide path. When the first and second plug connector housings are joined, pins integrally formed on the second plug connector housing are inserted into the guide paths, respectively. Each pin subsequently moves along the associated guide path via a rotary actuation of the rotary lever. As a result of which the first and second plug connector housings and electrical contact elements situated therein are pushed toward one another. When the rotary lever has reached its rotary end position, the two plug connector housings as well as the electrical contact elements are connected to one another via the achieved displacement.

In the course of the rotational movement of the rotary lever, the two plug connectors arrive at a position relative to one another in which the first driver element situated on the rotary lever may cooperate with the second driver element situated on the slide. The first driver element engages with the second driver element and translationally displaces the slide, thereby bringing a first locking element on the first plug connector housing and a second locking element on the slide into a locking position relative to one another.

BRIEF DESCRIPTION OF THE DRAWINGS

An exemplary embodiment of the present invention is explained in greater detail below with reference to the drawings, which show the following.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
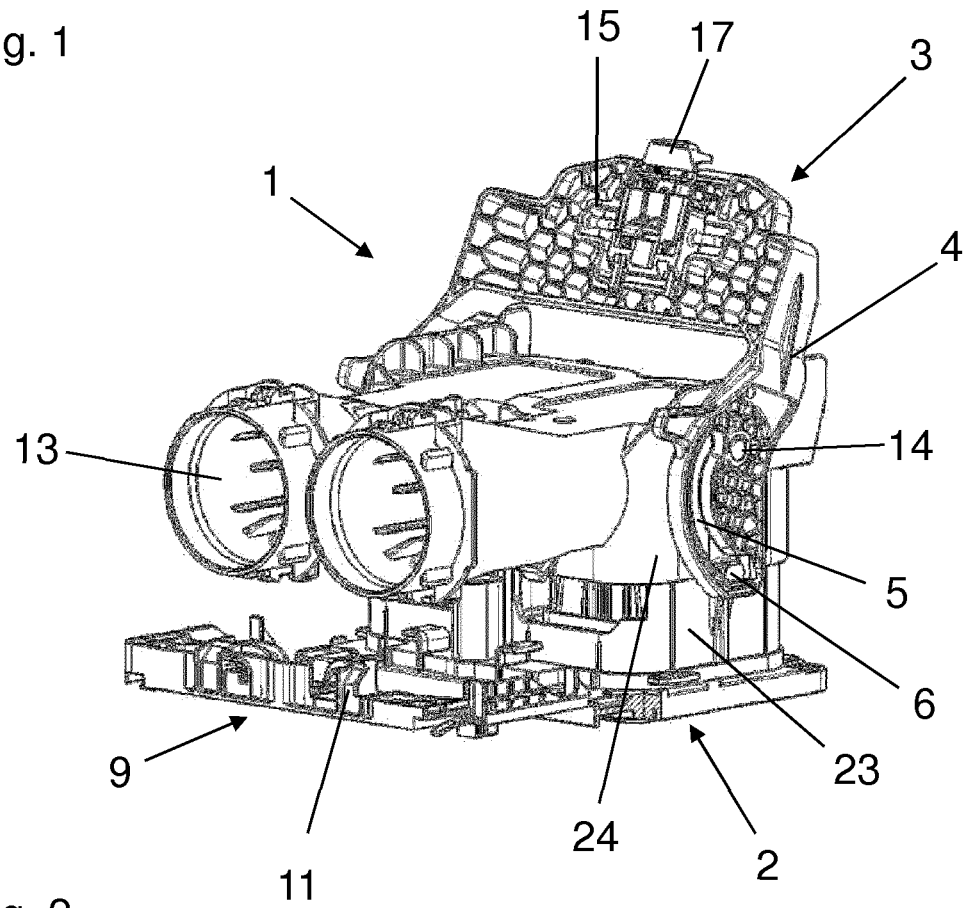
FIG. 1 illustrates a plug connector assembly with first and second plug connectors of the plug connector assembly being in a pre-locked position.
Figure 2:
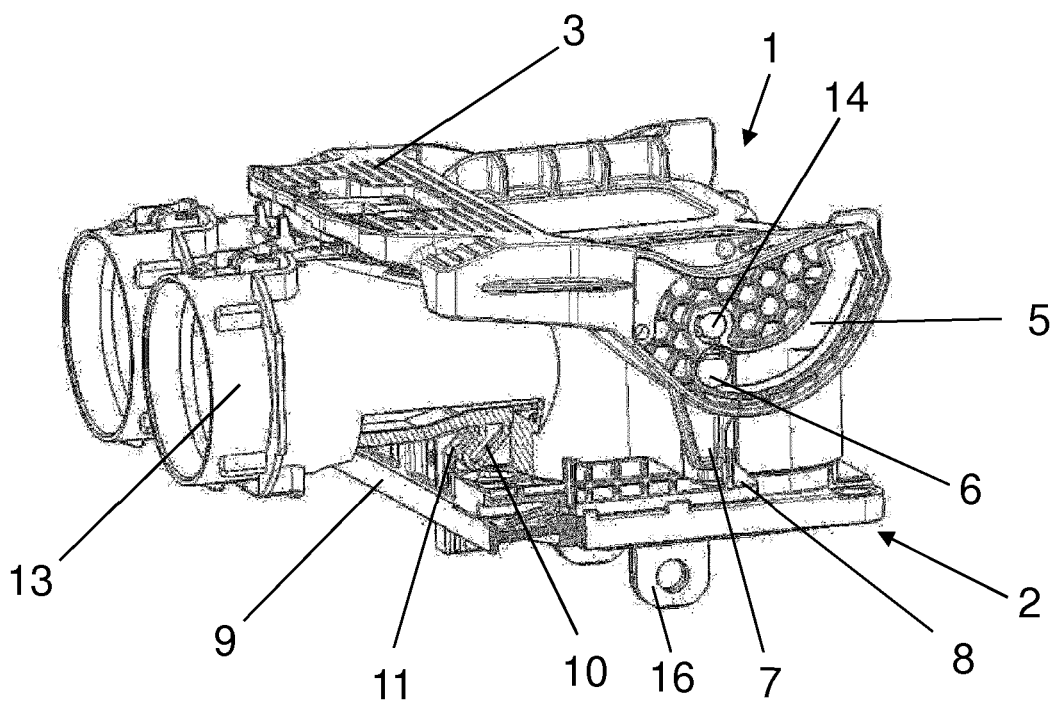
FIG. 2 illustrates the plug connector assembly with the first and second plug connectors being in a final locked position.

Referring now to FIGS. 1 and 2, a plug connector assembly in accordance with an embodiment of the present invention is shown. The plug connector assembly is made up of two plug connectors. The plug connectors may be used in an electric vehicle for establishing a charging plug connection. In this case, the first plug connector forms a mobile connector and the second plug connector is preferably fixedly connected to the body of the electric vehicle. To simplify the drawings herein, depiction of electrical components, such as electrical connection cables and electrical contact elements which are of course present for an actual installed plug connector assembly, for the most part have been dispensed with in the drawings herein. The first and second plug connectors are therefore represented in the drawings herein essentially by their first and second plug connector housings 1 and 2, respectively.

Two horizontally aligned cable outlet connectors 13 at which the connection of two connection lines, which have relatively large cross sections in relation to the size of first plug connector housing 1 and which therefore are also heavy, are provided at the first plug connector housing.

The outlet direction of a connector 16 of second plug connector housing 2, discernible in FIG. 2, extends perpendicularly downwardly with respect to its base area, and thus at a right angle to the outlet direction of the connection lines of first plug connector housing 1 that exit from cable outlet connectors 13. The plug connector assembly as illustrated in FIGS. 1 and 2 is thus designed as a right-angle plug connector assembly.

First and second plug connector housings 1 and 2 internally fasten mutually complementary pin-like and socket-like contact elements (not illustrated) which may be designed as flat plugs or round plugs. Since contact elements designed for high electrical loads typically apply quite high contact forces, the joining of the first and second plug connectors is assisted here by a force-multiplying rotary lever mechanism.

For this purpose, a rotary lever 3 is supported on first plug connector housing 1 so as to be swivelable about a bearing point 14. Rotary lever 3 is made up of two mutually parallel side faces 4 that are connected to one another via a connecting section 15. At the same time, connecting section 15 fulfills a function as a grip handle and actuating element for rotary lever 3.

The two side faces 4 of rotary lever 3, of which only one is fully discernible in the drawings, are symmetrical to one another, and each has a guide path 5. After first and second plug connector housings 1 and 2 are loosely joined, with rotary lever 3 raised up, in each case a guide pin 6 that is integrally formed on second plug connector housing 2 may be inserted into the guide path. From the initial position of rotary lever 3 illustrated in FIG. 1, the rotary lever may then be manually swiveled until it is in the end position illustrated in FIG. 2. Guide pins 6 follow guide paths 5 at both side faces 4 of rotary lever 3.

Since the course of guide paths 5 comes increasingly closer to bearing point 14 of rotary lever 3, guide pins 6 of second plug connector housing 2 are led increasingly closer to bearing point 14. This brings about a relative movement between first and the second plug connector housing 1 and 2, which thus come increasingly closer to one another due to the swiveling of rotary lever 3. It is advantageous that, due to use of the force-multiplying rotary lever 3, the joining of first and second plug connector housings 1 and 2 may take place with little effort.

In the end position of rotary lever 3 illustrated in FIG. 2, first and second plug connector housings 1 and 2 as well as the electrical contact elements (not illustrated) of the first and second plug connectors are already completely connected to one another.

Apparent in FIG. 1 at connecting section 15 of the first plug connector is a mechanical Connector Position Assurance (CPA) lock which may be manually displaced, and which in the end position of rotary lever 3 (FIG. 2) locks and thus mechanically secures rotary lever 3 to first plug connector housing 1.

To additionally achieve stabilization of the mechanical connection of first and second plug connector housings 1 and 2, a translationally movable guided element 9, referred to here as a slide, is situated on second plug connector housing 2.

Slide 9 may be displaced perpendicularly with respect to the connecting direction of the two plug connector housings 1 and 2 by actuating rotary lever 3 on first plug connector housing. For this purpose, side faces 4 of rotary lever 3 each have an integrally formed (i.e., molded on) tab-like, first driver element 7. First driver element 7 cooperates with a second driver element 8 on slide 9 when rotary lever 3 is swiveled from the initial position into the end position, and thus displaces slide 9 against the other components of second plug connector housing 2.

At the same time, this displacement of slide 9 moves a second locking element 11, situated on slide 9, against a first locking element 10, situated on first plug connector housing 1. First plug connector housing 1 is thus mechanically fixed to slide 9, and thus at the same time to second plug connector housing 2, via the joined locking elements 10 and 11.

The connecting point of the two locking elements 10 and 11 is preferably situated between contact chambers 23 and 24 of first and second plug connector housings 1 and 2 and the outlets of cable outlet connectors 13 of first plug connector housing 1. The joined locking elements 10 and 11 thus support the shear forces, which act due to the weight forces of the outlet lines on contact chambers 23 and 24 of first and second plug connector housings 1 and 2, at an appropriate location.

It is particularly advantageous that the joining of locking elements 10 and 11 does not require an additional installation step, and instead takes place automatically when rotary lever 3 is flipped or turned over.

Figure 3:
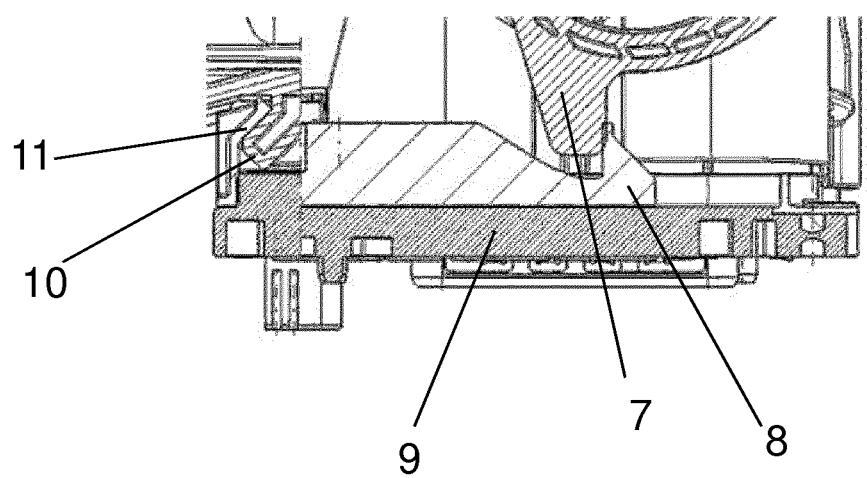
FIG. 3 illustrates a detailed view of driver elements and locking elements of the plug connector assembly.
Figure 4:
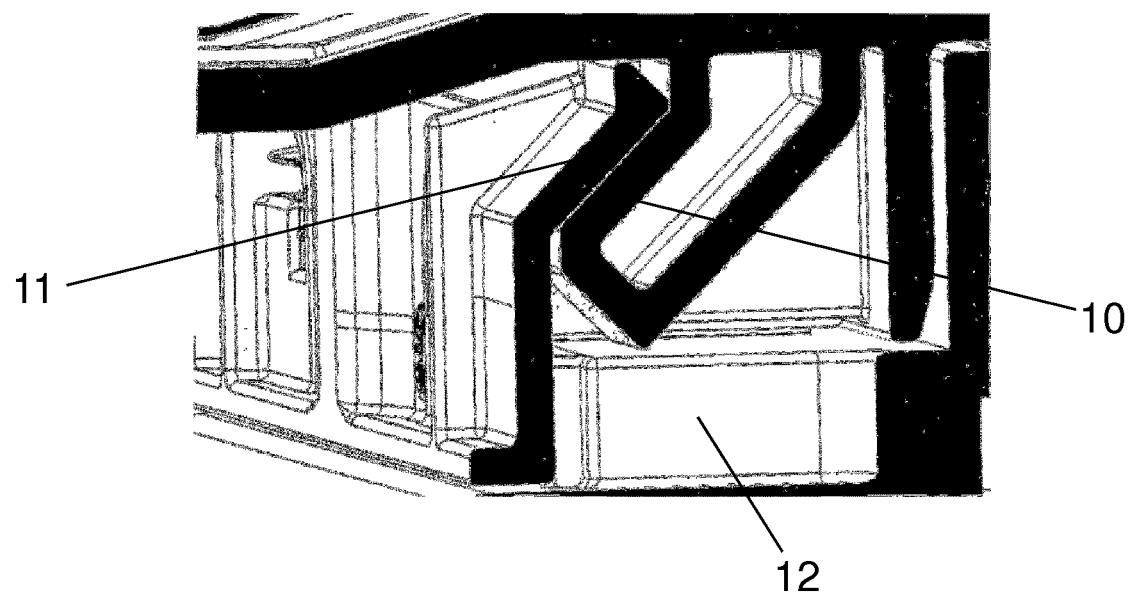
FIG. 4 illustrates a detailed view of the locking elements.
Figure 7:
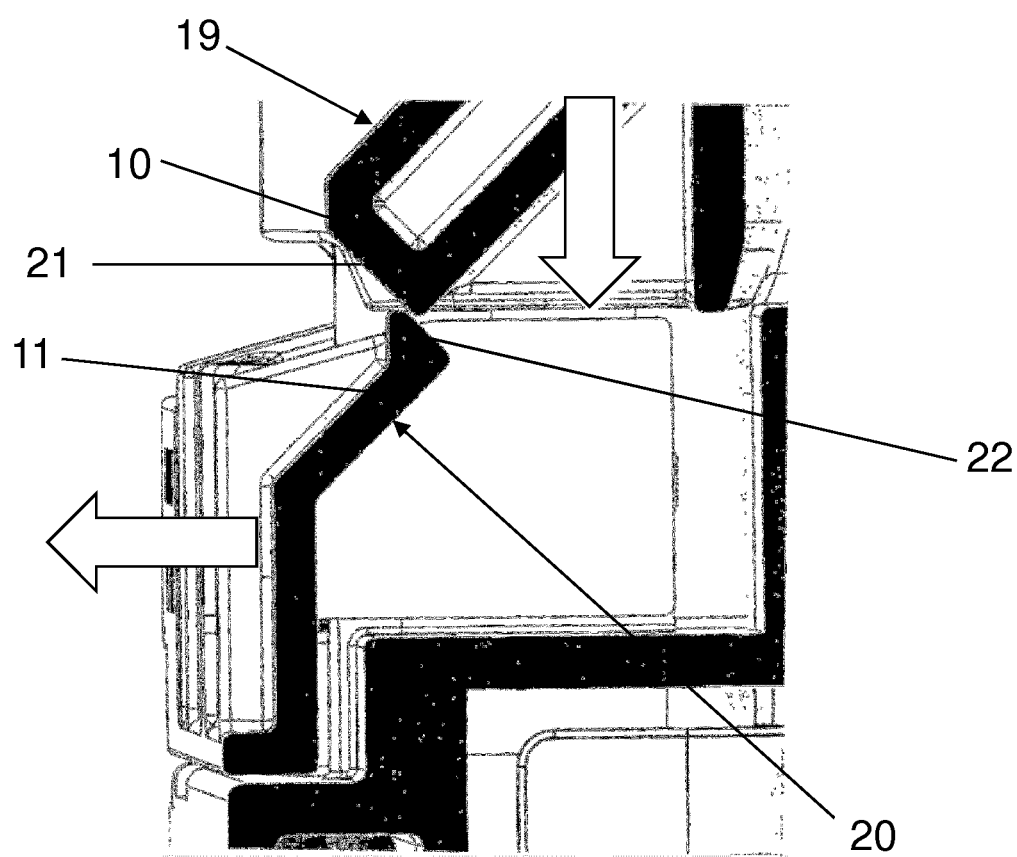

The two joined-together locking elements 10 and 11 are illustrated in FIG. 3 and in enlarged scale in FIG. 4. Locking elements 10 and 11 form surface sections 19 and 20, respectively (see FIG. 7) that are angled relative to one another. Surface sections 19 and 20 of the first and second locking elements 10 and 11, respectively, directly contact one another. These surface sections 19 and 20 are oriented at an angle of approximately 45° with respect to the movement direction of slide 9 or the insertion direction of first and second plug connector housings 1 and 2.

The bottom (or lower) edge of first locking element 10 preferably rests on a partial section 12 of slide 9, so that first locking element 10 is held clamped between partial section 12 of slide 9 and second locking element 11. Vertical movements of first plug connector housing 1 are effectively prevented in this way.

Figure 5:
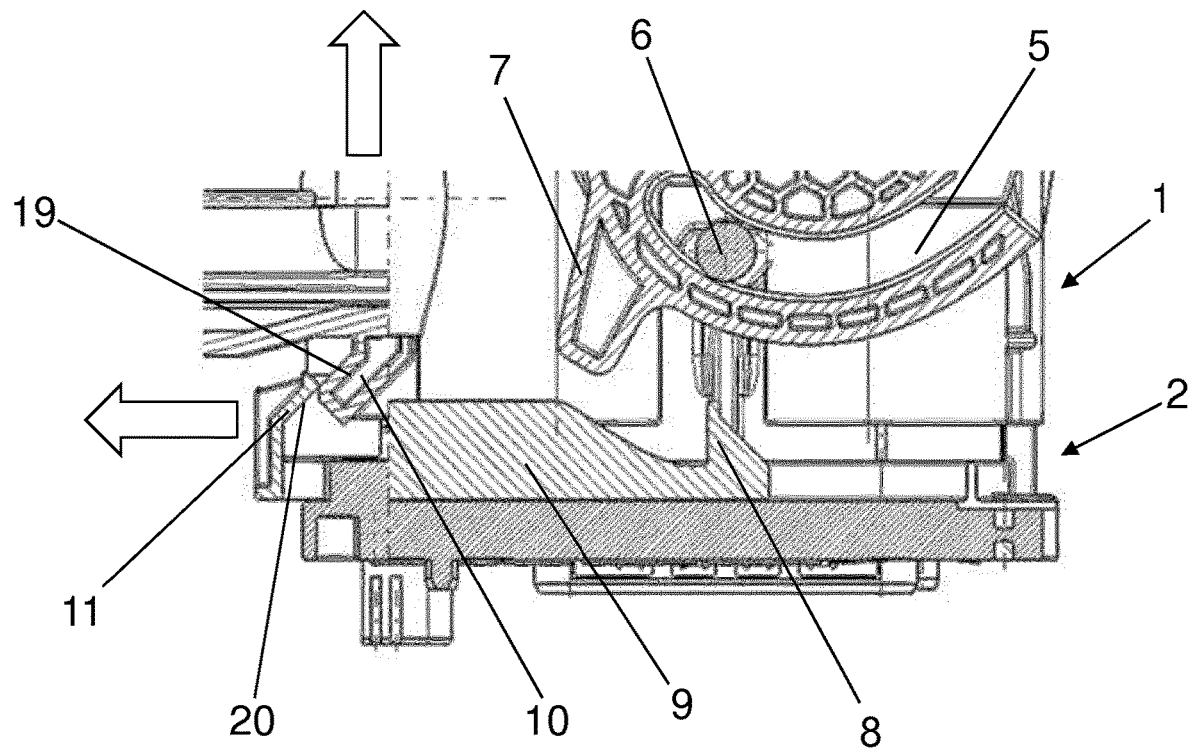
FIG. 5 illustrates the cooperation of the locking elements when first and second plug connector housings of the first and second plug connectors, respectively, are disconnected.

FIG. 5 shows that locking elements 10 and 11 automatically detach from one another when first and second plug connector housings 1 and 2 are disconnected. After CPA lock 17 is unlocked, the disconnection of first and second plug connector housings 1 and 2 is initiated by swiveling rotary lever 3 in the direction of its initial position. In the process, first driver element 7, integrally formed on rotary lever 3, moves away from second driver element 8 on slide 9, thus at the same time freeing up the movability of slide 9.

With the rotational movement of rotary lever 3 in the direction of its initial position, guide pins 6 also move along guide paths 5, thus disconnecting first and second plug connector housings 1 and 2 from one another. First locking element 10 is thus also lifted in the upward vertical direction, indicated in FIG. 5.

This causes surface section 20 of second locking element 11 to slide off from surface section 19 of first locking element 10, as the result of which slide 9 moves laterally in an avoidance movement in the direction of its initial position. Second locking element 11 is thus moved in the outward horizontal direction, indicated in FIG. 5. First and second locking elements 10 and 11 are thus completely unlocked and allow full disconnection of first and second plug connector housings 1 and 2 from one another.

Figure 6:
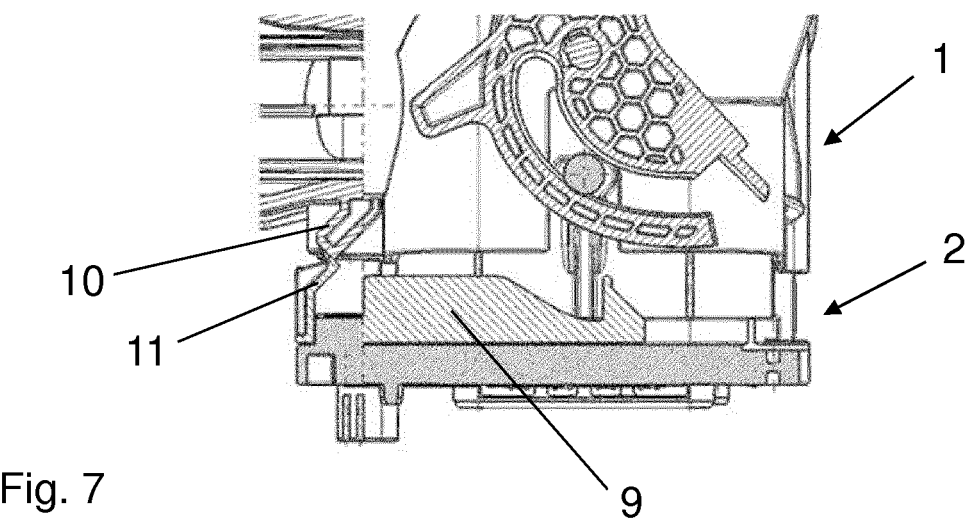
FIGS. 6 and 7 illustrate the cooperation of the locking elements in an incorrect position of a slide of the plug connector assembly.

When first and second plug connector housings 1 and 2 are unconnected, slide 9 on second plug connector housing 2 is in principle freely displaceable. It is thus possible that slide 9 is not in its intended initial position at the beginning of the joining of first and second plug connector housings 1 and 2. If slide 9 is in such an incorrect position, illustrated in FIGS. 6 and 7, then the two locking elements 10 and 11 meet one another with their end sections when first and second plug connector housings 1 and 2 are joined together.

The two locking elements 10 and 11 therefore advantageously have end faces 21 and 22, respectively, oriented approximately perpendicularly with respect to their surface sections 19 and 20, respectively, which contact one another in parallel when the locking elements 10 and 11 meet. During a vertical movement of first locking element 10, second locking element 1I thus deflects laterally, thereby displacing slide 9 in the direction of its initial position, so that first locking element 10 may move past second locking element 11 in the vertical direction. Upon further movement of rotary lever 3, slide 9, as explained above, is displaced into its intended end position by the cooperating driver elements 7 and 8, and first and second locking elements 10 and 11 are thus joined together.

Slide 9 situated on second plug connector housing 2, together with first and second locking elements 10 and 11 on first plug connector housing 1 and on slide 9, respectively, thus provide a stabilizing additional locking action between first and second plug connector housings 1 and 2 without increasing the installation effort when connecting or disconnecting the plug connectors.

LIST OF REFERENCE NUMERALS

1 first plug connector housing
2 second plug connector housing
3 rotary lever
4 side faces
5 guide path(s) (guideway(s); guide track(s))
6 guide pin(s)
7 first driver element(s)
8 second driver element(s)
9 slide
10 first locking element
11 second locking element
12 partial section
13 cable outlet connectors (connector stubs)
14 bearing point
15 connecting section
16 connection
17 Connector Position Assurance (CPA) lock
19, 20 surface sections
21, 22 end faces
23, 24 contact chambers While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A plug connector assembly comprising:

a first plug connector having a first plug connector housing including a first locking element;

a second plug connector having a second plug connector housing;

a rotary lever on the first plug connector housing, the rotary lever having a first driver element, the rotary lever further having a pair of side faces that are connected to one another, the side faces each having a guide path into which in each case a guide pin on the second plug connector housing is inserted in a first rotational position of the rotary lever and is displaced along the guide path by rotation of the rotary lever whereby the plug connector housings are moved toward one another and electrical contact elements within the plug connector housings connect to one another;

a slide that is linearly movable on the second plug connector housing, the slide having a second driver element and a second locking element;

wherein the first driver element of the rotary lever cooperates in a form-fit manner with the second driver element of the slide when the rotary lever rotates causing the slide to linearly move as the rotary lever rotates; and the second locking element of the slide is displaced relative to the first locking element of the first plug connector housing when the slide linearly moves as the rotary lever rotates whereby a form-fit locking action between the first and second locking elements may be established or cancelled.

2. The plug connector assembly of claim 1 wherein:

the first and second locking elements form respective first and second surface sections that are oriented at an angle of about 45° with respect to a displacement direction of linear movement of the slide.

3. The plug connector assembly of claim 2 wherein:

the first and second locking elements have mutually parallel end faces.

4. The plug connector assembly of claim 1 wherein:

the first and second plug connectors are disposed at a right-angle relative to one another.

* * * * *